(12) United States Patent
Veillette

(10) Patent No.: US 9,166,934 B2
(45) Date of Patent: Oct. 20, 2015

(54) SYSTEM AND METHOD FOR OPERATING MESH DEVICES IN MULTI-TREE OVERLAPPING MESH NETWORKS

(71) Applicant: Trilliant Networks, Inc., Redwood City, CA (US)

(72) Inventor: Michel Veillette, Waterloo (CA)

(73) Assignee: Trilliant Networks, Inc., Redwood City, CA (US)

(*) Notice: Subject to any disclaimer, the term of this patent is extended or adjusted under 35 U.S.C. 154(b) by 272 days.

(21) Appl. No.: 13/799,270

(22) Filed: Mar. 13, 2013

(65) Prior Publication Data

US 2013/0198305 A1  Aug. 1, 2013

Related U.S. Application Data

(62) Division of application No. 12/275,257, filed on Nov. 21, 2008, now abandoned.

(60) Provisional application No. 60/989,957, filed on Nov. 25, 2007, provisional application No. 60/989,967, filed on Nov. 25, 2007, provisional application No. 60/989,958, filed on Nov. 25, 2007, provisional application No. 60/989,964, filed on Nov. 25, 2007, provisional application No. 60/989,950, filed on Nov. 25, 2007, provisional application No. 60/989,953, filed on Nov. 25, 2007, provisional application No. 60/989,975, filed on Nov. 25, 2007, provisional (Continued)

(51) Int. Cl.
*H04W 84/18* (2009.01)
*H04L 12/58* (2006.01)
*H04L 12/18* (2006.01)

(52) U.S. Cl.
CPC .............. *H04L 51/00* (2013.01); *H04L 12/184* (2013.01); *H04L 12/1854* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 7,016,306 B2* | 3/2006 | Alapuranen et al. | .......... | 370/238 |
| 2007/0066319 A1* | 3/2007 | Kado | ............................ | 455/450 |
| 2007/0248065 A1* | 10/2007 | Banerjea et al. | ............. | 370/338 |
| 2008/0069034 A1* | 3/2008 | Buddhikot et al. | ........... | 370/328 |

*Primary Examiner* — Timothy J Weidner
(74) *Attorney, Agent, or Firm* — Moser Taboada

(57) ABSTRACT

Methods, systems, and devices described herein can allow a mesh device to participate in multiple mesh networks. The method comprises associating with a first access point over a first mesh network, wherein the first access point manages the first mesh network; responsive to receiving a neighbor information broadcast from a neighboring mesh device, updating a neighborhood table stored in an accessible memory, wherein the neighbor information includes a neighboring mesh device information and a neighboring mesh device network identifier; responsive to a request to transmit a message to a destination, determining a next device, wherein the next device is on a calculated path towards the destination, the path including mesh devices from a plurality of mesh networks; and transmitting the message to the next device.

25 Claims, 8 Drawing Sheets

| Tree PAN ID | Neighbor Address | Neighbor PAN ID | Avg Quality | Num of Hops | Min Quality | Freshness | |
|---|---|---|---|---|---|---|---|
| 1 | A1 | B5 | 2 | 3 | 2 | 4 | —502 |
| 35 | BB | D2 | 2 | 2 | 3 | 4 | —502 |
| 9A | 3C | 3C | 3 | 2 | 3 | 2 | —502 |
| B | CC | 4 | 1 | 1 | 2 | 1 | —502 |

Related U.S. Application Data application No. 60/989,959, filed on Nov. 25, 2007, provisional application No. 60/989,961, filed on Nov. 25, 2007, provisional application No. 60/989,962, filed on Nov. 25, 2007, provisional application No. 60/989,951, filed on Nov. 25, 2007, provisional application No. 60/989,955, filed on Nov. 25, 2007, provisional application No. 60/989,952, filed on Nov. 25, 2007, provisional application No. 60/989,654, filed on Nov. 25, 2007, provisional application No. 60/992,312, filed on Dec. 4, 2007, provisional application No.60/992,313, filed on Dec. 4, 2007, provisional application No. 60/992,315, filed on Dec. 4, 2007, provisional application No. 60/025,279, filed on Jan. 31, 2008, provisional application No. 61/025,270, filed on Jan. 31, 2008, provisional application No. 61/025,276, filed on Jan. 31, 2008, provisional application No. 61/025,282, filed on Jan. 31, 2008, provisional application No. 61/025,271, filed on Jan. 31, 2008, provisional application No. 61/025,287, filed on Jan. 31, 2008, provisional application No. 61/025,278, filed on Jan. 31, 2008, provisional application No. 61/025,273, filed on Jan. 31, 2008, provisional application No. 61/025,277, filed on Jan. 31, 2008, provisional application No. 61/094,116, filed on Sep. 4, 2008.

| Tree PAN ID | Neighbor Address | Neighbor PAN ID | Avg Quality | Num of Hops | Min Quality | Freshness |
|---|---|---|---|---|---|---|
| 1 | A1 | B5 | 2 | 3 | 2 | 4 |
| 35 | BB | D2 | 2 | 2 | 3 | 4 |
| 9A | 3C | 3C | 3 | 2 | 3 | 2 |
| B | CC | 4 | 1 | 1 | 2 | 1 |

| 504 | 506 | 508 | 510 | 512 | 514 | 516 |
|---|---|---|---|---|---|---|
| 1 | A1 | B5 | 2 | 3 | 2 | 4 |

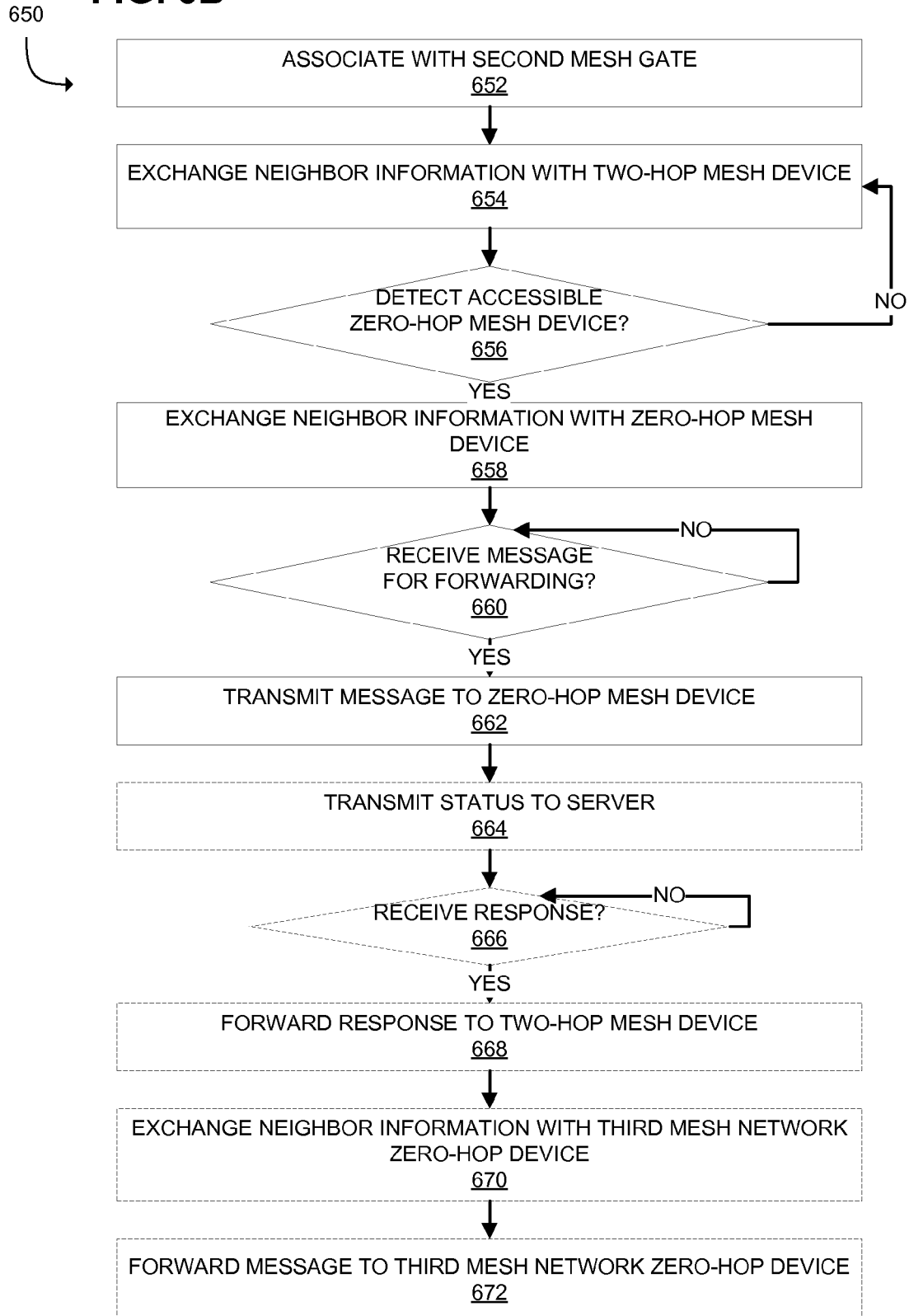

SYSTEM AND METHOD FOR OPERATING MESH DEVICES IN MULTI-TREE OVERLAPPING MESH NETWORKS

CROSS-REFERENCE TO RELATED APPLICATIONS

This application is a divisional and claims the benefit of priority to application Ser. No. 12/275,257 filed on Nov. 21, 2008 which is incorporated herein by reference in its entirety. This application also claims the benefit of priority to the following United States provisional patent applications which are incorporated herein by reference in their entirety:

Ser. No. 60/989,957 entitled "Point-to-Point Communication within a Mesh Network", filed Nov. 25, 2007;

Ser. No. 60/989,967 entitled "Efficient And Compact Transport Layer And Model For An Advanced Metering Infrastructure (AMI) Network," filed Nov. 25, 2007;

Ser. No. 60/989,958 entitled "Creating And Managing A Mesh Network Including Network Association," filed Nov. 25, 2007;

Ser. No. 60/989,964 entitled "Route Optimization Within A Mesh Network," filed Nov. 25, 2007;

Ser. No. 60/989,950 entitled "Application Layer Device Agnostic Collector Utilizing ANSI C12.22," filed Nov. 25, 2007;

Ser. No. 60/989,953 entitled "System And Method For Real Time Event Report Generation Between Nodes And Head End Server In A Meter Reading Network Including From Smart And Dumb Meters," filed Nov. 25, 2007;

Ser. No. 60/989,975 entitled "System and Method for Network (Mesh) Layer And Application Layer Architecture And Processes," filed Nov. 25, 2007;

Ser. No. 60/989,959 entitled "Tree Routing Within a Mesh Network," filed Nov. 25, 2007;

Ser. No. 60/989,961 entitled "Source Routing Within a Mesh Network," filed Nov. 25, 2007;

Ser. No. 60/989,962 entitled "Creating and Managing a Mesh Network," filed Nov. 25, 2007;

Ser. No. 60/989,951 entitled "Network Node And Collector Architecture For Communicating Data And Method Of Communications," filed Nov. 25, 2007;

Ser. No. 60/989,955 entitled "System And Method For Recovering From Head End Data Loss And Data Collector Failure In An Automated Meter Reading Infrastructure," filed Nov. 25, 2007;

Ser. No. 60/989,952 entitled "System And Method For Assigning Checkpoints To A Plurality Of Network Nodes In Communication With A Device Agnostic Data Collector," filed Nov. 25, 2007;

Ser. No. 60/989,954 entitled "System And Method For Synchronizing Data In An Automated Meter Reading Infrastructure," filed Nov. 25, 2007;

Ser. No. 60/992,312 entitled "Mesh Network Broadcast," filed Dec. 4, 2007;

Ser. No. 60/992,313 entitled "Multi Tree Mesh Networks", filed Dec. 4, 2007;

Ser. No. 60/992,315 entitled "Mesh Routing Within a Mesh Network," filed Dec. 4, 2007;

Ser. No. 61/025,279 entitled "Point-to-Point Communication within a Mesh Network", filed Jan. 31, 2008, and which are incorporated by reference.

Ser. No. 61/025,270 entitled "Application Layer Device Agnostic Collector Utilizing Standardized Utility Metering Protocol Such As ANSI C12.22," filed Jan. 31, 2008;

Ser. No. 61/025,276 entitled "System And Method For Real-Time Event Report Generation Between Nodes And Head End Server In A Meter Reading Network Including From Smart And Dumb Meters," filed Jan. 31, 2008;

Ser. No. 61/025,282 entitled "Method And System for Creating And Managing Association And Balancing Of A Mesh Device In A Mesh Network," filed Jan. 31, 2008;

Ser. No. 61/025,271 entitled "Method And System for Creating And Managing Association And Balancing Of A Mesh Device In A Mesh Network," filed Jan. 31, 2008;

Ser. No. 61/025,287 entitled "System And Method For Operating Mesh Devices In Multi-Tree Overlapping Mesh Networks", filed Jan. 31, 2008;

Ser. No. 61/025,278 entitled "System And Method For Recovering From Head End Data Loss And Data Collector Failure In An Automated Meter Reading Infrastructure," filed Jan. 31, 2008;

Ser. No. 61/025,273 entitled "System And Method For Assigning Checkpoints to A Plurality Of Network Nodes In Communication With A Device-Agnostic Data Collector," filed Jan. 31, 2008;

Ser. No. 61/025,277 entitled "System And Method For Synchronizing Data In An Automated Meter Reading Infrastructure," filed Jan. 31, 2008;

Ser. No. 61/094,116 entitled "Message Formats and Processes for Communication Across a Mesh Network," filed Sep. 4, 2008.

This application hereby references and incorporates by reference each of the following United States patent applications filed contemporaneously herewith:

Ser. No. 12/275,236 entitled "Point-to-Point Communication within a Mesh Network", filed Nov. 21, 2008;

Ser. No. 12/275,234 entitled "Efficient And Compact Transport Layer And Model For An Advanced Metering Infrastructure (AMI) Network," filed Nov. 21, 2008;

Ser. No. 12/275,238 entitled "Communication and Message Route Optimization and Messaging in a Mesh Network," filed Nov. 21, 2008;

Ser. No. 12/275,242 entitled "Collector Device and System Utilizing Standardized Utility Metering Protocol," filed Nov. 21, 2008;

Ser. No. 12/275,252 entitled "Method and System for Creating and Managing Association and Balancing of a Mesh Device in a Mesh Network," filed Nov. 21, 2008; and Ser. No. 12/275,257 entitled "System And Method For Operating Mesh Devices In Multi-Tree Overlapping Mesh Networks", filed Nov. 21, 2008.

BACKGROUND

1. Field of the Invention

This invention pertains generally to methods and systems that allow a mesh device to participate in multiple mesh networks.

2. Description of the Related Art

A mesh network is a wireless network configured to route data between mesh device nodes within the network. A mesh network allows for continuous connections and reconfigurations around broken or blocked paths by retransmitting messages from node to node until a destination is reached. Mesh networks differ from other networks in that nodes can connect to each other via multiple hops. Thus, mesh networks are self-healing: the network remains operational when a node or a connection fails.

Advanced Metering Infrastructure (AMI) or Advanced Metering Management (AMM) are systems that measure, collect and analyze utility usage, from mesh devices such as electricity meters, gas meters, and water meters, through a network on request or a pre-defined schedule. This infrastructure includes hardware, software, communications, customer associated systems and meter data management software. The infrastructure collects and distributes information to customers, suppliers, utility companies and service providers. This enables these businesses to either participate in, or provide, demand response solutions, products and services. Customers may alter energy usage patterns from normal consumption patterns in response to demand pricing. This improves system load and reliability.

A mesh gate is an interface between the mesh network and a server over a wide area network (WAN). Each mesh device may associate with a mesh network and a mesh gate, leaving the mesh network vulnerable to a failure in the mesh gate. In addition, there may be limited paths between mesh devices within the mesh network.

SUMMARY

Methods, systems, and devices described herein can allow a mesh device to participate in multiple mesh networks. A plurality of mesh devices can each associate with a mesh network, each mesh network managed by an access point. Mesh devices exchange neighbor information with neighboring mesh devices, including information about mesh devices associated with a different mesh network. Communication paths can include mesh devices of multiple mesh networks. This provides path diversity among mesh devices and improves bandwidth and reliability. In addition, this provides access diversity in case of mesh network or mesh gate failures.

The mesh device can also be located on a boundary between two mesh networks and participate in both mesh networks. This provides path diversity among mesh devices and improves in-premise communication. In addition, this provides access diversity in case of a mesh gate failure. The mesh device may exchange neighbor information with nearby mesh devices of a different mesh network, thus allow a two-hop penetration into the neighboring mesh network.

In one aspect, a method for a first mesh device to communicate in an overlapping mesh network environment comprises associating with a first access point over a first mesh network, wherein the first access point manages the first mesh network; responsive to receiving a neighbor information broadcast from a neighboring mesh device, updating a neighborhood table stored in an accessible memory, wherein the neighbor information includes a neighboring mesh device information and a neighboring mesh device network identifier; responsive to a request to transmit a message to a destination, determining a next device, wherein the next device is on a calculated path towards the destination, the path including mesh devices from a plurality of mesh networks; and transmitting the message to the next device.

In another aspect, a system for communicating in an overlapping mesh network environment comprises a plurality of access points, each access point managing a mesh network; and a plurality of mesh devices, each mesh device associated with a mesh network, wherein each mesh device is configured to: (i) responsive to receiving a neighbor information broadcast from a neighboring mesh device, update a neighborhood table stored in an accessible memory, wherein the neighbor information includes a neighboring mesh device information and a neighboring mesh device network identifier; (ii) responsive to a request to transmit a message to a destination, determine a next device, wherein the next device is on a calculated path towards the destination, the path including mesh devices from a plurality of mesh networks; and (iii) transmit the message to the next device.

In another aspect, a mesh device for communicating in an overlapping mesh network environment comprises a radio for communicating on a predetermined mesh network channel; a memory for storing a neighborhood table; a processor configured to: associate with a first access point over a first mesh network via the radio, wherein the first access point manages the first mesh network; responsive to receiving a neighbor information broadcasted from a neighboring mesh device, update the neighborhood table stored in the memory, wherein the neighbor information includes a neighboring mesh device information and a neighboring mesh device network identifier; responsive to a request to transmit a message to a destination, determine a next device, wherein the next device is on a calculated path towards the destination, the path including mesh devices from a plurality of mesh networks; and transmit the message to the next device via the radio.

In another aspect, a computer-readable medium including instructions adapted to execute a method for a first mesh device to communicate in an overlapping mesh network environment comprises associating with a first access point over a first mesh network, wherein the first access point manages the first mesh network; responsive to receiving a neighbor information broadcasted from a neighboring mesh device, updating a neighborhood table stored in an accessible memory, wherein the neighbor information includes a neighboring mesh device information and a neighboring mesh device network identifier; responsive to a request to transmit a message to a destination, determining a next device, wherein the next device is on a calculated path towards the destination, the path including mesh devices from a plurality of mesh networks; and transmitting the message to the next device.

In another aspect, a data structure defined in a computer readable medium comprises a plurality of entries, each of the plurality of entries representing at least one device and storing at least one characteristic of the device; and each of the plurality of entries including a plurality of fields for storing characteristics of at least one neighboring device.

In another aspect, a method comprises associating with a first mesh gate over a first mesh network; exchanging neighbor information with an accessible same-network mesh device over the first mesh network; detecting an accessible one-hop mesh device on a second mesh network; exchanging neighbor information with the one-hop mesh device; and forwarding a message from the one-hop mesh device to the first mesh network.

In another aspect, a method comprises associating with a second mesh network; exchanging neighbor information with a two-hop mesh device over the second mesh network; detecting an accessible zero-hop mesh device on a first mesh network; exchanging neighbor information with the zero-hop mesh device; and transmitting a message to the zero-hop mesh device for forwarding to the first mesh network.

In another aspect, a device comprises a neighborhood table, the neighborhood table storing mesh network device information; and a radio configured to communicate with a first mesh network and a second mesh network, wherein the device is configured to, in operation, associate with a first mesh gate over the first mesh network, exchange neighbor information stored in the neighborhood table with an accessible same-network mesh device over the first mesh network, detect an accessible one-hop mesh device on the second mesh network, exchange neighbor information stored in the neighborhood table with the one-hop mesh device, and forward a message from the one-hop mesh device to the first mesh network.

In another aspect, a computer program stored in a computer readable form for execution in a processor and processor coupled memory to execute a method comprises associating with a first mesh gate over a first mesh network; exchanging neighbor information with an accessible same-network mesh device over the first mesh network; detecting an accessible one-hop mesh device on a second mesh network; exchanging neighbor information with the one-hop mesh device; and forwarding a message from the one-hop mesh device to the first mesh network.

In another aspect, a computer program stored in a computer readable form for execution in a processor and processor coupled memory to execute a method comprises associating with a second mesh network; exchanging neighbor information with a two-hop mesh device over the second mesh network; detecting an accessible zero-hop mesh device on a first mesh network; exchanging neighbor information with the zero-hop mesh device; and transmitting a message to the zero-hop mesh device for forwarding to the first mesh network.

In another aspect, a method comprises associating with a first mesh gate over a first mesh network; exchanging neighbor information with an accessible same-network mesh device over the first mesh network; detecting an accessible one-hop mesh device on a second mesh network; exchanging neighbor information with the one-hop mesh device; forwarding a message from the one-hop mesh device to the first mesh network; associating with a second mesh network; exchanging neighbor information with a two-hop mesh device over the second mesh network; detecting an accessible zero-hop mesh device on a first mesh network; exchanging neighbor information with the zero-hop mesh device; and transmitting a message to the zero-hop mesh device for forwarding to the first mesh network.

In another aspect, a computer program stored in a computer readable form for execution in a processor and processor coupled memory to execute a method comprises associating with a first mesh gate over a first mesh network; exchanging neighbor information with an accessible same-network mesh device over the first mesh network; detecting an accessible one-hop mesh device on a second mesh network; exchanging neighbor information with the one-hop mesh device; forwarding a message from the one-hop mesh device to the first mesh network; associating with a second mesh network; exchanging neighbor information with a two-hop mesh device over the second mesh network; detecting an accessible zero-hop mesh device on a first mesh network; exchanging neighbor information with the zero-hop mesh device; and transmitting a message to the zero-hop mesh device for forwarding to the first mesh network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6B illustrates a process for a one-hop device to forward communications between a first mesh network and a second mesh network, according to an exemplary embodiment.

DETAILED DESCRIPTION

Reference will now be made in detail to the preferred embodiments of the present invention, examples of which are illustrated in the accompanying drawings.

Figure 1A:
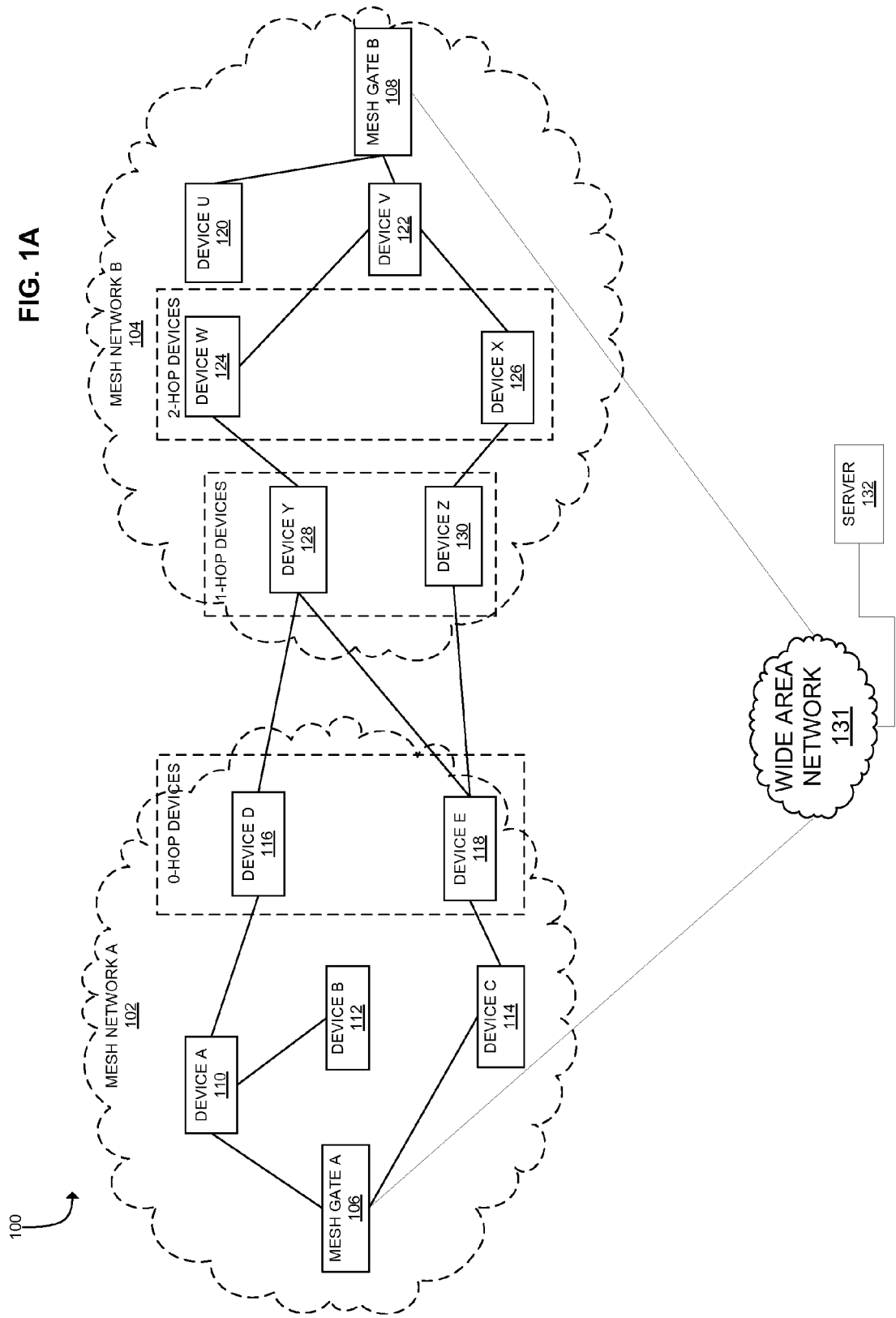
FIG. 1A illustrates a system for providing communications in an AMI system, according to an exemplary embodiment.

FIG. 1A illustrates an exemplary system for providing communications in an AMI system 100. The AMI system may include a plurality of mesh networks, such as mesh network A 102 and mesh network B 104. While only two mesh networks are depicted, any number of mesh networks may exist in the AMI system. Mesh network A 102 includes a mesh gate A 106 and mesh devices A 110, B 112, C 114, D 116 and E 118. Mesh network B 104 includes mesh gate B 108 and mesh devices U 120, V 122, W 124, X 126, Y 128 and Z 130. Although FIG. 1 depicts only five mesh devices in the mesh network A 102, any number of mesh devices may be used in the mesh network A 102. The mesh devices A 110, B 112, and C 114 may perform required functions within the mesh network A 102. For example, a mesh device may be a meter, a user interface such as for example a thermostat, an output device such as a utilities usage display, or any other device or subsystem required or benefited by the AMI system.

The mesh gate 106 and the mesh devices function as nodes in the mesh network, which dynamically creates and maintains links between the nodes. Each mesh device may transmit messages to the mesh gate A 106 and other mesh devices within the mesh network A 102. Only mesh devices A 110 and C 114 are in direct communication with the mesh gate A 106. However, mesh device B 112 may reach the mesh gate via mesh device A 110.

A mesh gate may also be referred to as an access point or a Neighborhood Area Network to Wide Area Network (NAN-WAN) gate. The mesh gate may perform any one or more of many different functions including, for example, but not limited to, one or any combination of: relaying information from a server (such as to a head end server) to the mesh network nodes, routing information, aggregating information from the nodes and microportals within any sub-network that may be configured for transmission to a server (such as to the head end server), acting as a home area network (HAN) sometimes also referred to as a premise area network (PAN) coordinator, acting as a NAN-WAN gate, transmitting firmware upgrades, and/or multicasting messages. The mesh gate may also be referred to as a collector because it collects information from the NAN-associated nodes or other nodes and/or microportals in its sub-network. A mesh gate may include a mesh radio to communicate with mesh devices over the mesh network and a WAN communication interface to communicate with the server over the WAN 131.

The mesh gate A 106 may provide a gateway between the mesh network A 102 and a server 132. The server 132 can also act as a head end. The server 132 can provide services to mesh devices within the AMI system, such as commissioning devices, providing software updates, providing metering pricing updates, receiving metering information, etc. The mesh gate A 106 may aggregate information from mesh devices (e.g., meters) within the mesh network and transmit the information to the server 132. The mesh gate A 106 may further forward messages from the mesh devices to the server 132, for example, status reports and meter readings. The mesh gate A 106 may further forward messages from the server 132 to the mesh devices, for example, instructions and queries. The server 132 may be a computing device configured to receive information, such as meter readings, from a plurality of mesh networks and meters. The server 132 may also be configured to transmit instructions to the mesh networks, mesh gates, and meters. It will be appreciated that while only one server is depicted, any number of servers may be used in the AMI system. For example, servers may be distributed by geographical location. Redundant servers may provide backup and failover capabilities in the AMI system.

The mesh devices may also exchange neighbor information with neighboring mesh devices from another mesh network. Neighbor information may for example include one or more of mesh device identifiers, a signal quality indicator or value, a distance to mesh gate indicator or value, and any other information necessary or advantageous to calculate a route from the mesh device. In one embodiment, the neighbor information includes each of these information items.

The mesh devices may exchange neighbor information with each other, where the neighbor information is propagated throughout the mesh network and used to determine a best path to the mesh gate. For example, mesh device A 110 knows it is a neighbor of the mesh gate. It will send the information to mesh device D 116, which then knows that in order to send a message to the mesh gate, it may ask mesh device A 110 to forward the message.

The mesh gate A 106 can manage the mesh network A 102 by maintaining an association (registration) table which can include information about in-network and out of network nodes and a neighborhood table which includes information about the nodes in the network and their neighbors (which may include out of network nodes) and other information for each mesh device within the mesh network A 102. When a new mesh device attempts to join mesh network A 102, it sends an association request to the mesh gate A 106, which will add the new mesh device to its neighborhood table. It will be appreciated that a mesh device association can include a registration for application service at the mesh gate A 102 or the server 132. The mesh gate A 102 and the server 132 can maintain a table of available applications and services and requesting mesh devices. More particularly, an exemplary neighborhood table is structured as described with respect to Tables 1 and 2 below:

TABLE 1

| Field Name | Data type | Description |
| --- | --- | --- |
| Neighborhood Table | array[MAX_NUM_NEIGHBORS] of Neighborhood Table Entry | List of neighbors |

Each Neighborhood Table entry consists of:

TABLE 2

| Field Name | Data type | Description |
| --- | --- | --- |
| Tree PAN Identifier | Binary 2 bytes | Identify the network tree for this entry. This network identifier can correspond to foreign network when the concept of overlapping network is implemented. In this context, the same neighbor can be reported multiple times within this list if associated to multiple network trees. |
| Neighbor Address | Binary 2 bytes | Address of this neighbor. |
| Neighbor PAN Identifier | Binary 2 bytes | Membership of this neighbor. |
| Avg LQI | Unsigned 8 bits | Average of the LQI value of each hop between this neighbor and the Coordinator using the preferred route within the specified network tree. The LQI for each hop correspond to the worst LQI recorded (LQI rx and LQI tx) for this hop. |
| | Unsigned 8 bits | See sub fields below: |
| Number Of Hop | Bits 4 to 7 | Number of hops between this neighbor and the Coordinator using the preferred route within the specified network tree. |
| Power Routing | Bit 2 | Set to one if this neighbor support routing for some period of time after a power outage. |
| Min LQI Class | Bit 0 to 1 | Minimum of all LQI rx and LQI tx for each hop between this neighbor and the Coordinator using the preferred route within the specified network tree. |
| LQI rx | Unsigned 8 bits | Average line quality measured for packets received from this neighbor. |
| LQI tx | Unsigned 8 bits | Average line quality measured for packets transmitted to this neighbor. |
| RSSI rx | Signed 8 bits | Average signal strength in dbm measured for packets received from this neighbor. |
| | Unsigned 8 bits | See sub fields below: |
| Preferred Route Flag | Bit 7 | Set to 1 when this neighbor represents the next hop on the preferred route within the specified network tree. When set to zero, this Neighbor can still be used for tree routing if its Number Of Hop is less or equal to the current Node. |
| Second Preferred Route Flag | Bit 6 | Set to 1 when this neighbor represents the second preferred route within the specified network tree. |
| Remote First Preferred Route | Bit 5 | Set to 1 when this neighbor reports that the current Node is its next hop on its preferred route. |
| Remote Second Preferred Route | Bit 4 | Set to 1 when this neighbor reports that the current Node is the second preferred route. |
| Freshness | Bits 0 to 3 | Countdown reset at each Neighbors Exchange received from this neighbor and decremented at each Neighbors Exchange period (each time a Neighbors |

TABLE 2-continued

| Field Name | Data type | Description |
|---|---|---|
| | | Exchange transmitted by the radio). When this field reach zero, the entry is considered deleted and can be reused for a different Node. |
| Preferred Route Ratio | Unsigned 16 bits | Preferred Ratio as defined in Section Error! Reference source not found.. Bits 12 to 14 = Min LQI Class Bits 8 to 11 = 15 − Number Of Hop Bits 0 to 7 = Avg LQI All this values are adjusted up to the current Node. |
| RX Source DLL Nonce Count | Unsigned 5 octets | The last authenticated DLL full nonce count received from this neighbor. |
| Transmission success rate | Unsigned 8 bits | Success rate in percentage of the last n transmission with this neighbor The value255 means no data available for that neighbor. This value is initialized to 100 prior to the first transmission and is updated as follows: When the transmission is successful $$S = s - \frac{s}{n} + \frac{1}{n}$$ When the transmission fail $$S = s - \frac{s}{n}$$ Where S: Estimated success rate s: Last estimated success rate n: Factor to adjust the adjustment speed of the estimated average (set by default to 30) |

When the number of Neighbors exceeds the capacity of the Neighborhood table, the radio applies the following order in its selection of Neighbors to keep: Best 5 Parents per network tree; Children using this Node as preferred route; Children or Sibling using this Node as second preferred route; and Remaining Nodes are included in the table in a round robin fashion to give the chance to every node to flag the current Node as preferred or second preferred route.

The mesh network B 104 may similarly include a mesh gate B 108 and at least one mesh device. The mesh network B 104 may neighbor or be adjacent to the mesh network A 102 and therefore some of the mesh devices of mesh network B 104 may be in radio transmit/receive range of mesh devices of the mesh network A 102.

In operation, the mesh networks may overlap and therefore provide path diversity among the mesh devices. For example, if device Y 128 is a thermostat and needs to transmit a message to device E 118, such as a utilities control unit, it is not necessary to transmit the instruction to mesh gate B 108 via mesh network B 104, which is then transmitted to mesh gate A 106 via a WAN 131, which is then transmitted to the device E 118 via mesh network A 102. Instead, device Y 128 receives neighbor information from device E 118 and realizes they are neighbors. Direct communication between the mesh devices is possible.

The mesh devices can utilize other accessible mesh gates as a secondary mesh gate in case of failure by the primary mesh gate with which the mesh device is associated. For example, mesh devices of mesh network B 104 may transmit messages to mesh gate A 106 if mesh gate B 108 fails to respond.

In one exemplary embodiment, neighboring mesh networks can operate on different channels or radio frequencies. This can improve wireless bandwidth within a mesh network and decrease interference from neighboring mesh network transmissions. The channels or radio frequencies can be predetermined.

It will be appreciated that a mesh device can allow penetration of any number of hops into a neighboring mesh network. However, because a path of each mesh device forwarding a message can be stored in the message header, a path length can be limited by a size of the message header. In one example embodiment, the path length can be limited to nine hops, thus allowing a penetration of nine-hops into neighboring mesh networks.

As shown in the exemplary illustrated embodiment, the mesh devices D 116 and E 118 may function as zero-hop devices. Zero-hop devices may be on the boundary of the mesh network, with children nodes that are mesh devices belonging to a second mesh network. Zero-hop devices may communicate with the mesh gate directly or through intermediate mesh devices. For example, the mesh device D 116 may reach the mesh gate A 106 via mesh device A 110. Similarly, the mesh device E 118 may reach the mesh gate A 106 via mesh device C 114. The neighborhood tables of zero-hop devices may include neighbors within mesh network A 102 as well as mesh network B 104.

The mesh devices Y 128 and Z 130 may function as one-hop devices. One-hop devices may be on the boundary of the mesh network B 104 and be neighbors with zero-hop devices of mesh network A 102. Thus, one-hop devices may communicate with the associated mesh gate B 108 or with mesh gate A 106 via the zero-hop devices. The neighborhood tables of one-hop devices may include neighbors within mesh network B 104 as well as mesh network A 102.

The mesh devices W 124 and X 126 may function as two-hop devices. Two-hop devices may be neighbors with one-hop devices, and therefore are two hops away from a neighboring mesh network. Thus, two-hop devices may communicate with the associated mesh gate B 108 or with mesh gate A 106 via the one-hop and zero-hop devices as well as mesh network A 102.

In the exemplary embodiment of system 100, the mesh devices U 120 and V 122 may not include information on mesh devices of mesh network A 102 in neighborhood tables. However, messages may be forwarded to two-hop devices for forwarding to mesh network A 102.

In operation, the one-hop and two-hop devices may utilize mesh gate A 106 as a secondary mesh gate in case of failure by mesh gate B 108. Over time, mesh device U 120 and mesh device V 122 may re-associate with a new mesh gate, but the one-hop and two-hop devices may utilize their secondary mesh gate immediately and suffer no downtime.

Figure 1B:
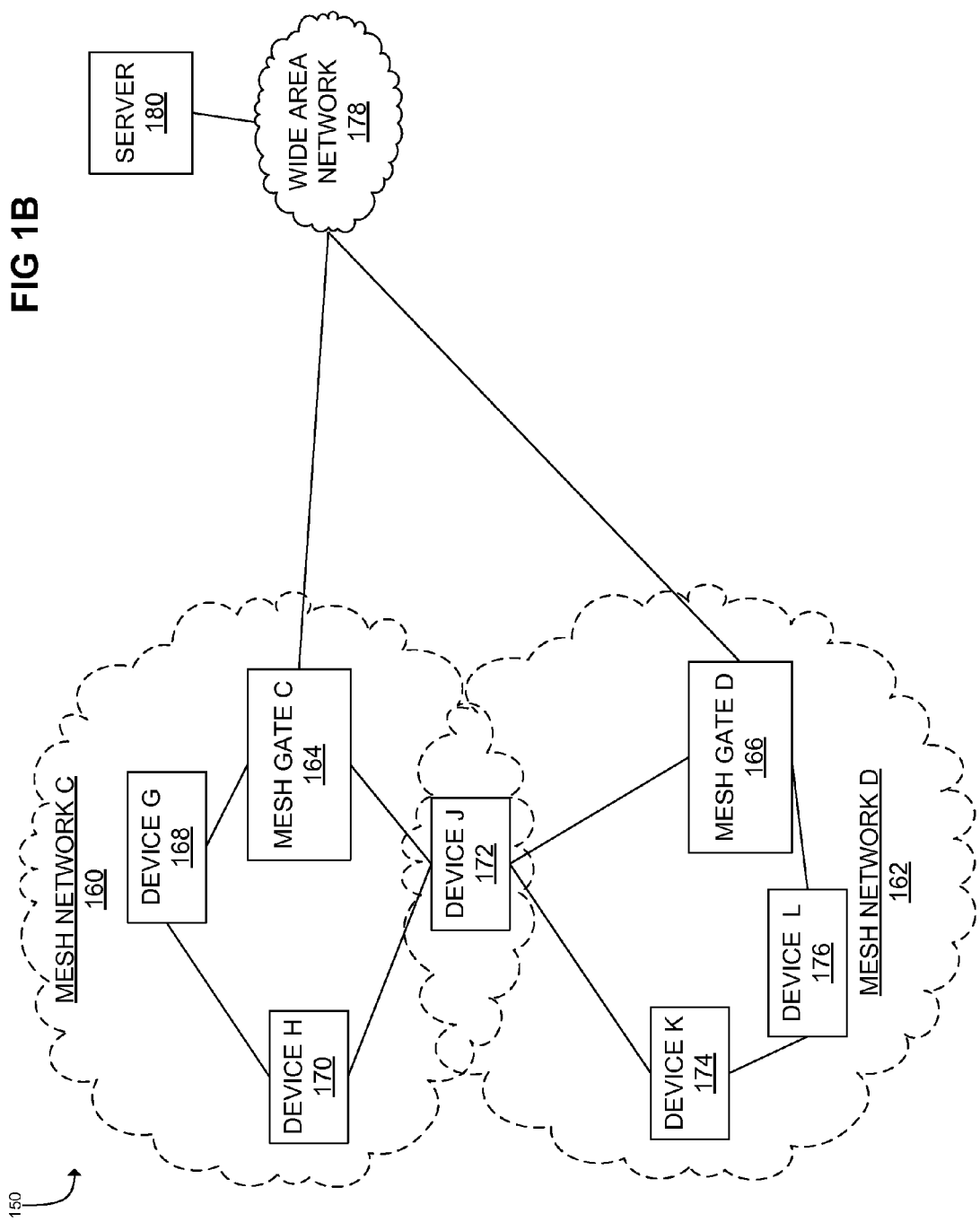
FIG. 1B illustrates a system for providing communications in an AMI system, according to another exemplary embodiment.

In an alternative embodiment of the AMI as shown in FIG. 1B, mesh devices may also serve as conduits between two networks. For example, in FIG. 1B, system 150 includes conduit device J 172 associated with mesh network C 160 and mesh network D 162. Mesh network C 160 includes device G 168, device H 170, and mesh gate C 164. Mesh network D 162 includes device K 174, device L 176, and mesh gate D 166. The mesh networks, mesh gates, and mesh devices shown in FIG. 1B are merely representative and alternate systems may include additional numbers and arrangements of mesh networks, mesh gates, and mesh devices. The mesh devices illustrated in FIG. 1B can serve a variety of functions and may be, for example, meters, thermostats, output devices such as displays, or any other device or subsystem required or benefited by the AMI system. Mesh gate C 164 and mesh gate D 162 communicate with server 180 via WAN 178. Except for mesh device J 172, the mesh devices and mesh gates can operate in a similar fashion to those mesh gates and mesh devices illustrated and described in connection with FIG. 1A.

With respect to mesh device J 172, this device may associate with mesh network C 160 and mesh network D 162 and act as a conduit between the two networks. Mesh device J 172 may allow mesh devices and mesh gates in one network to communicate with mesh devices and mesh gates in the other network. For example, if mesh gate C 164 was not available to receive communications from mesh devices in mesh network C 160, mesh device H 170 may communicate a message to mesh gate D 166 via mesh device J 172. Mesh device J 172 may be similar to the other mesh devices illustrated in FIG. 1B except that it may have additional software allowing it to serve as a conduit between the two networks.

Figure 2B:
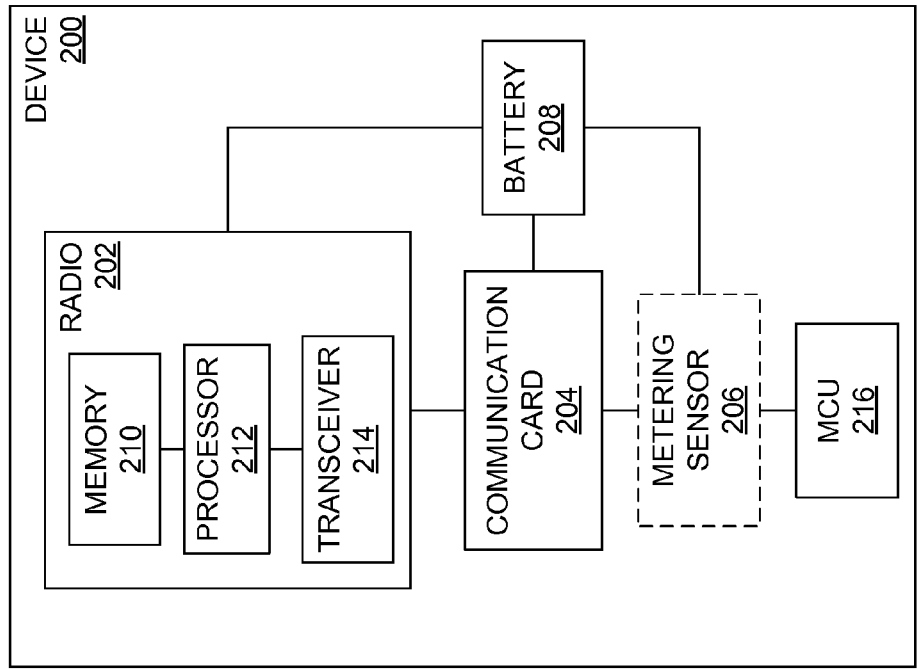
FIG. 2B illustrates a mesh gate for use within a mesh network, according to an exemplary embodiment.
Figure 2A:
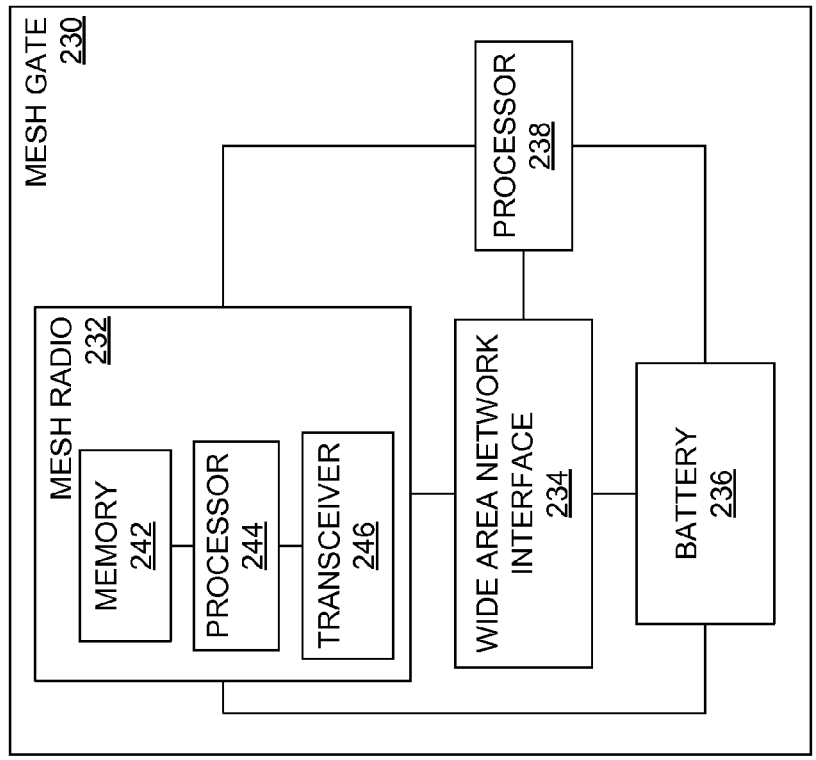
FIG. 2A illustrates a mesh device for use within a mesh network, according to an exemplary embodiment.

FIG. 2A illustrates an exemplary mesh device 200 for use within a mesh network. Mesh device 200 may include a radio 202, a communication card 204, a metering sensor 206, and a battery or other power or energy storage device or source 212. The radio 202 may include a memory 210, a processor 212, a transceiver 214, and a microcontroller unit (MCU) 216 or other processor or processing logic.

The mesh device 200 can be any device configured to participate as a node within a mesh network. Mesh device 200 can be a mesh repeater, which can be a wired device configured to retransmit received mesh transmissions. The mesh repeater can extend over a range of a mesh network and provide mesh network functionality to mesh devices that enter sleep cycles.

The mesh device 200 may communicate with a mesh gate and other mesh devices over a mesh network. For example, the mesh device 200 may be a gas, water, electricity, or other utility meter installed in a residential, commercial, or industrial building or other location to monitor utilities usage. The mesh device 200 may also control access to utilities on receipt of instructions such as instructions or control signals received from a server, for example, by reducing or stopping the flow of gas, water or electricity. In an alternative, the mesh device 200 may be a mobile asset that needs to be tracked by the AMI system.

The radio 202 may be a mesh radio configured to communicate with a mesh network. The radio 202 may transmit, receive, and forward messages to the mesh network. Any meter within the mesh network may thus communicate with any other meter or mesh gate by communicating with its neighbor and requesting a message be forwarded. The radio 202 may also communicate with an off-network device not associated with the mesh network.

The communication card or circuit 204 may interface between the radio and the sensor. Sensor readings or other data may be converted to radio signals for transmission over the radio. The communication card 204 may optionally but advantageously include encryption/decryption functionality or other security measures to protect the transmitted data. The communication card 204 may also decode instructions received from the server.

The optional metering sensor 206 may be a gas, water, electricity, media content or information meter sensor, or another sensor. For example, digital flow sensors may be used to measure a quantity of water or gas flowing into a residence or building. Alternatively, the sensor 206 may be an electricity meter configured to measure a quantity of electricity flowing over a power line.

In an alternative embodiment, the optional metering sensor 206 may be replaced by another component for performing functions within the AMI system. For example, the mesh device may provide a user interface, such as a thermostat or other utilities control or display. In this example, the metering sensor may be replaced with a thermostat interface. For example, the mesh device may provide a display screen, such as an LCD display screen that displays information for the user. In another example, the mesh device may be a simple repeater for extending the range of the mesh network. In this example, the mesh device may simply receive and re-transmit mesh transmissions on the mesh network.

The battery or other energy storage device 208 may be configured to independently power the mesh device 200 during a power outage. For example, the battery 208 may be a large capacitor storing electricity to power the mesh device 200 for at least five minutes after a power outage. Small compact but high capacity capacitors known as super capacitors are known in the art and may advantageously be used. One exemplary super capacitor is the SESSCAP 50f 2.7v 18×30 mm capacitor manufactured by NESSCAP Co., Ltd. of Wonchun-Dong 29-9, Paldal-Ku, Soowon, Kyonggi-Do 442-380, Korea. Alternative battery technologies may be used, for example, galvanic cells, electrolytic cells, fuel cells, flow cells, and voltaic cells.

The memory 210 may store instructions and run-time variables for execution. For example, the memory 210 may include both volatile and non-volatile memory. The memory 210 may also store a history of sensor readings from the metering sensor 206 and an incoming queue of server instructions.

The mesh device 200 may also include a memory in additional to memory 210. A neighborhood table may be stored in a memory accessible by the mesh device 200. For example, the neighborhood table may store a best parent field, a best five parents field, a mesh gate load field, a number of hops to the mesh gate field, and a mesh gate path signal quality field. The neighborhood table information may be transmitted to other mesh devices in a neighbor exchange and may also be transmitted to a mesh gate. The neighborhood table may be used to determine a best route on the mesh network for a message to be transmitted. Alternatively, the neighborhood table can include other fields.

Information from the neighborhood table can be used to calculate a path to an access point. For example, a calculated path can have a good connection to a mesh gate as defined by signal quality, number of hops, and a mesh gate load. It will be appreciated that various weightings can be used to compute a calculated path value, and a best valued path is selected for use.

The processor 212 may execute instructions, for example, stored in the memory. Instructions stored in memory 210 may be ordinary instructions, for example, provided at time of meter installation, or special instructions received from the server during run time.

The transceiver 214 may transmit to and receive from a mesh network wireless signals. The transceiver 214 may be configured to transmit sensor readings and status updates under control of the processor. The transceiver 214 may receive server instructions from a server, which are communicated to the memory and the processor.

The MCU 216 can execute firmware or software required by the mesh device 200. The firmware or software can be installed at manufacture or via a mesh network over the radio 202.

In one embodiment, any number of MCUs can exist in the mesh device 200. For example, two MCUs can be installed, a first MCU for executing firmware handling communication protocols, and a second MCU for handling applications.

It will be appreciated that a mesh device and a mesh gate can share the architecture of mesh device 200. The radio 202 and the MCU 216 provide the necessary hardware, and the MCU 216 executes any necessary firmware or software.

Each component may be modular and configured for easy removal and replacement. This facilitates component upgrading over a lifetime of the meter as new functionality are developed and deployed in the AMI system.

Meters may be located in geographically dispersed locations within an AMI system. For example, a meter may be located near a gas line, an electric line, or a water line entering a building or premise to monitor a quantity of gas, electricity, or water flowing through the line. The meter may communicate with other meters, even with meters of different types, and mesh gates through a mesh network. The meter may transmit meter readings and receive instructions via the mesh network.

In operation, the mesh device 200 may communicate over a mesh network and directly with an off-network device via the radio 202. The communication card or circuit 204 may interface between the metering sensor 206 and the radio 202. For example, sensor readings may be transmitted to and instructions received from a server. In addition, the mesh device 200 may participate in the mesh network by forwarding any messages that require forwarding to a next mesh device on a dynamically determined or pre-determined path.

In an alternative, mesh devices may be similar to meters except the metering sensor is replaced by whatever component is necessary to perform the mesh device's function. For example, a user display may include an output screen or set of indicator lights. For example, a thermostat may include a dial or other user interface or mechanism for receiving user input and an analog/digital converter to produce an input signal.

FIG. 2B is a block diagram that illustrates an exemplary mesh gate 230 for use within a mesh network. The mesh gate 230 may include a mesh radio 232, a wide area network interface 234, a battery 236, and a processor or processing logic 238. The mesh radio 232 may include a memory 242, a processor 244, and a transceiver 246. The mesh gate 230 may interface between mesh devices such as meters over a mesh network and a server over a WAN. The mesh gate 230 may be installed in a central location relative to the meters and also communicate with a server over a WAN.

The mesh radio 232 may be a mesh radio configured to communicate with meters over a mesh network. The radio 232 may transmit, receive, and forward messages to the mesh network.

The WAN interface 234 may communicate with a server over a WAN. For example, the WAN may be a cellular network, a private network, a dial up connection, or any other network. The WAN interface 234 may optionally include encryption/decryption functionality or other security measures to protect data being transmitted to and from the server.

The battery or other energy or power source 236 may be configured to independently power the mesh gate 230 during a power outage. For example, the battery 236 may be a large capacitor storing electricity to power the mesh gate 230 for at least five minutes after a power outage. While not limitations of embodiments of the invention, a capacitor may advantageously be used in a meter that may have access to a power source such as an electric utility meter, and a battery may be a more suitable power source for a gas meter which may not frequently be connected to a continuous or even intermittent source of power or energy.

The processor or processing logic 238 may control the mesh radio 232 and the WAN interface 234. Meter information received from the meters over the mesh radio 232 may be compiled into composite messages for transmission to the server. Server instructions may be received from the WAN interface 234 and transmitted to meters in the mesh network for execution. Server instructions may also be received from the WAN interface 234 for execution by the processor 238.

The mesh radio 232, WAN interface 234, battery 236, and processor 238 may be modular and configured for easy removal and replacement. This facilitates component upgrading over a lifetime of the mesh gate 230.

As described more specifically above, an accessible memory of each mesh device may store neighbor information for all mesh devices within the mesh network (and within communication range of the mesh device regardless of association with a specific mesh network) and associated with the mesh device. The neighborhood table information may be exchanged between mesh devices and also transmitted to the mesh gate. The mesh gate may be configured to calculate various routing based on the compiled neighborhood table.

The memory 242 of the mesh radio 232 may store instructions and run-time variables of the mesh radio 232. For example, the memory 242 may include both volatile and non-volatile memory. The memory 242 may also store a history of meter communications and a queue of incoming server instructions. For example, meter communications may include past sensor readings and status updates.

The mesh gate may include an additional memory configured to store values in the execution of mesh gate functions. For example, a history of meter readings or status updates may be stored for future retrieval.

The processor 244 of the mesh radio 232 may execute instructions, for example, stored in memory 242. Instructions stored in memory 242 may be ordinary instructions, for example, provided at time of mesh gate installation, or special instructions received from the server during run-time.

The transceiver 246 of the mesh radio 232 may transmit and receive wireless signals to a mesh network. The transceiver 246 may be configured to receive sensor readings and status updates from a plurality of meters in the mesh network. The transceiver 246 may also receive server instructions, which are communicated to the memory 242 and the processor 244.

In operation, the mesh gate may interface between a mesh network and a server. The mesh gate may communicate with meters in the mesh network and communicate with the server over a WAN network. By acting as a gateway, the mesh gate forwards information and instructions between the meters in its mesh network and the server. The mesh gate may also function as a node within the mesh network, by forwarding messages between mesh devices.

Figure 3:
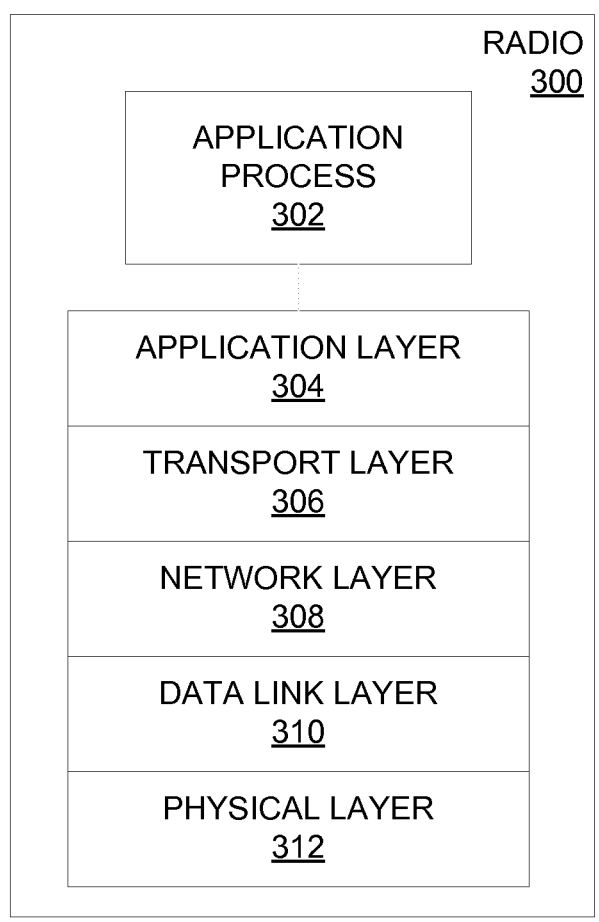
FIG. 3 illustrates a network stack for use within a mesh radio, according to an exemplary embodiment.

FIG. 3 illustrates an exemplary network stack for use within a mesh radio 300. The application process 302 may communicate with an application layer 304, a transport layer 306, a network layer 308, a data link layer 310 and a physical layer 312.

The radio 300 may be a mesh radio installed in a mesh gate, a mesh device, or an off-network device. For example, the radio 300 may be a component in a meter, a mesh gate, or any other mesh device configured to participate in a mesh network or communicate with other mesh devices. The radio 300 may be configured to transmit wireless signals over a predetermined or dynamically determined frequency to other radios.

The application process 302 may be an executing application that requires information to be communicated over the network stack. For example, the application process 302 may be software supporting an AMI system, such as software or firmware executing in some processor or processing logic on an electricity meter or a mesh gate.

The application layer 304 interfaces directly with and performs common application services for application processes. Functionality may include semantic conversion between associated application processes. For example, the application layer may be implemented as ANSI C12.12/22, which standard as of the filing date of this application is hereby incorporated by reference.

The transport layer 306 responds to service requests from the application layer and issues service requests to the Internet layer. It delivers data to the appropriate application on the host computers. For example, the layer may be implemented as TCP (Transmission Control Protocol), and UDP (User Datagram Protocol), or according to other known or convenient protocols.

The network layer 308 is responsible for end to end (source to destination) packet delivery. The network layer's functionality may advantageously include transferring variable length data sequences from a source to a destination via one or more networks while maintaining the quality of service, and error control functions. Data will be transmitted from its source to its destination, even if the transmission path involves multiple hops or relays. For example, the network layer 308 may translate a short address into a network address. A short address may for example be a two byte address used to identify mesh devices within a mesh network. The short address may be assigned by the access point. A network address may be an eight byte unique address used to identify the mesh device from among other mesh devices. The network address may be assigned at manufacture or by a server. Short addresses may be used within a mesh network to shorten messages that are addressed to another mesh device within the same mesh network. Long addresses may be used to address mesh devices of another mesh network or whose short address is not known to a message sender.

The data link layer 310 transfers data between adjacent network nodes in a network, wherein the data is in the form of packets. The layer provides functionality including transferring data between network entities and error correction/detection. For example, the layer may be implemented as IEEE 802.15.4, which standard as of the filing date of this application is hereby incorporated by reference.

The physical layer 312 may be the most basic network layer, transmitting bits over a data link connecting network nodes. No packet headers or trailers are included. The bit stream may be grouped into code words or symbols and converted to a physical signal, which is transmitted over a transmission medium, such as radio waves. The physical layer provides an electrical, mechanical, and procedural interface to the transmission medium. For example, the layer may be implemented as IEEE 802.15.4.

In operation, the network stack provides different levels of abstraction for programmers within an AMI system. Abstraction reduces a concept to only information which is relevant for a particular purpose. Thus, each level of the network stack may assume the functionality below it on the stack is implemented. This facilitates programming features and functionality for the AMI system. The illustrated network stack may facilitate intra-mesh network communication by utilizing a short address to identify addressees.

Figure 4:
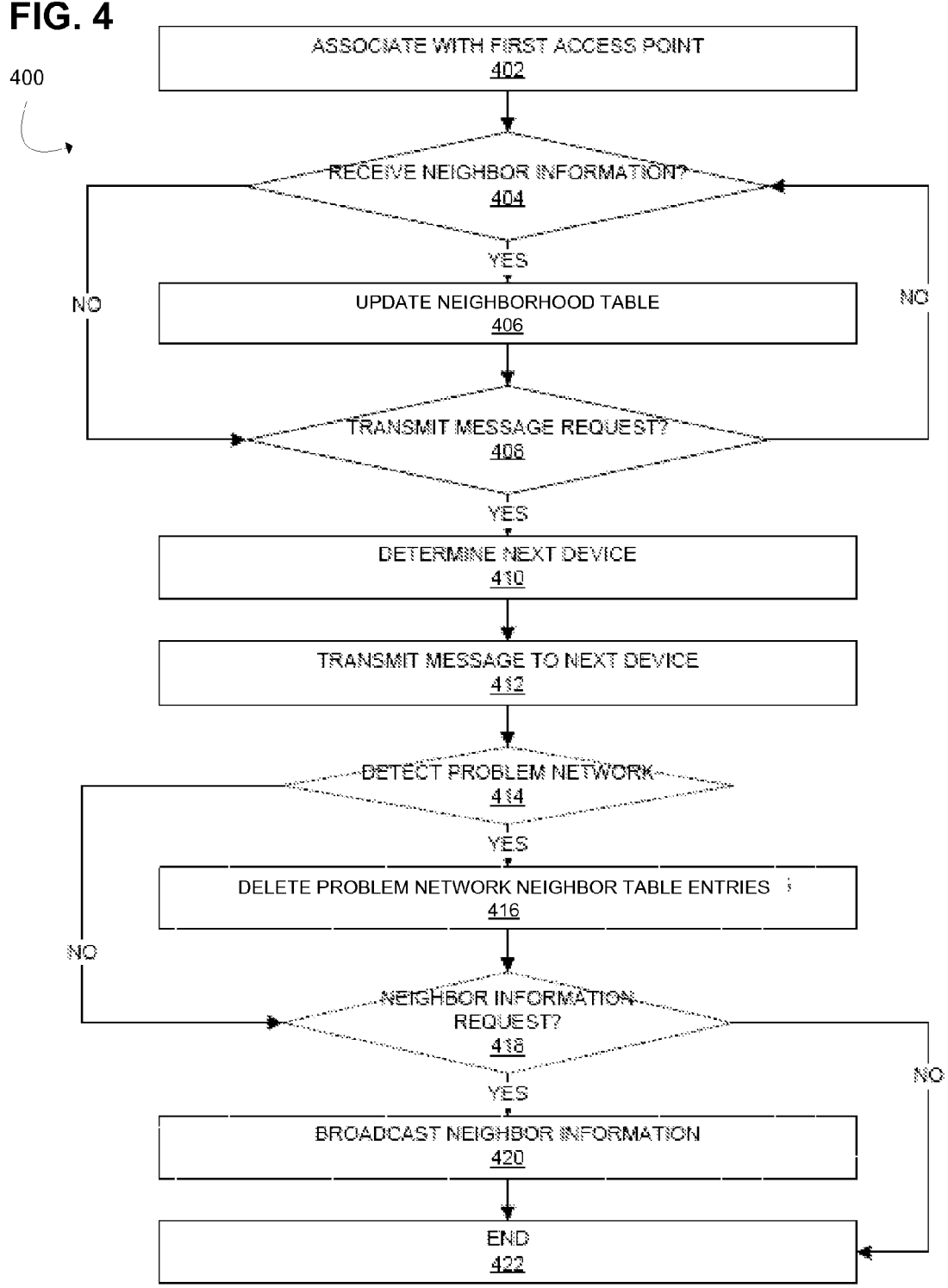
FIG. 4 illustrates a process for a mesh device to communicate in a multi-mesh network environment, according to an exemplary embodiment.

FIG. 4 illustrates an exemplary process 400 for a mesh device to communicate in a multiple mesh network environment. It should be understood that process 400 and the other exemplary processes described herein may be performed in different sequences or certain steps may be performed in parallel in alternate embodiments. The procedure may execute on a mesh device associated with a first mesh network and within radio range of neighboring mesh devices, some of which are associated to a second mesh network. The procedure may allow mesh devices of the two mesh networks to communicate amongst each other and provide network overlap.

In step or process 402, the mesh device can associate with a first access point. Recall that an access point may also be referred to as mesh gate or a NAN-WAN gate. Associating with the first access point includes transmitting an association request to the first access point and awaiting a confirmation. If the first access point is not within radio range of the mesh device, the message is transmitted via a mesh network.

The mesh network includes neighboring mesh devices, as shown in FIG. 1, which can forward the association request towards the access point. The neighboring mesh devices will also forward the confirmation back to the mesh devices. Once the mesh device is associated with the first access point, it will participate in the mesh network and forward messages from its neighbors, as required.

For example, the association can happen periodically after a predetermined or dynamically determined time interval or according to some other policy, at a mesh device start up, or when communication with the first access point is lost. If there is no neighboring mesh device associated with the first mesh network within radio range, the mesh device can retry association after a predetermined or dynamically determined time interval or according to some other policy.

In step or process 404, the mesh device can test whether neighbor information has been received. In a mesh network, neighboring mesh devices will periodically broadcast mesh device information and neighbor information. Neighbor information may include one or any combination of mesh device identifiers, signal strength, distance from access point, and other information helpful in determining a path through a mesh network. In one non-limiting example, the neighbor information includes each of these.

If neighbor information is received, the mesh device proceeds to step or process 406. If no neighbor information is received, the mesh device proceeds to step or process 408.

In one example, the neighbor information will include preferred routes over a plurality of mesh networks to various destinations.

In step or process 406, the mesh device can update a neighborhood table in accessible memory. The mesh device can be configured with an accessible memory which stores a neighborhood table. The neighborhood table stores mesh device information and neighbor information of neighboring mesh devices.

Filters can be used to restrict a size of the neighborhood table. For example, the neighborhood tables can be configured to only store mesh device information of mesh devices within a predetermined number of hops from the mesh device or have specified signal quality.

In step or process 408, the mesh device can test whether a message transmit request has been received. For example, the message transmit request can be received from the mesh device when a message must be sent via the mesh network. For example, the message can be intended for a server, the first access point, or another mesh device.

Alternatively, the message transmit request can be received from a received message. The received message can be received from a neighboring mesh device for transmitting. A message destination will be included in the received message, which is parsed by the mesh device.

If a transmit message request is received, the mesh device proceeds to step or process 410. If no transmit message request is received, the mesh device returns to step or process 404.

In step or process 410, the mesh device can determine a next device on a path to the destination. The next device can be the destination of the message, such as a neighboring mesh device or an access point within radio range. Alternatively, the next device can be the neighboring mesh device to which the mesh device must transmit the message for forwarding.

If the destination is a server or another device not on the mesh network, the message can be received by an access point or another device configured to interface between the mesh network and the off-mesh network device.

The next device can be determined from a next device table stored in accessible memory, where the mesh device stores a list of destinations and a next device associated with each destination. Alternatively, the next device can be calculated by the first access point and stored in the next device table. In another alternative embodiment, the next device can be calculated by the mesh device as required.

In step or process 412, the mesh device can transmit the message to the next device. The message can be broadcast on a radio channel used by the mesh network and addressed to the next device by including a next device identifier in a message header. All other mesh devices will ignore the message because they are not the next device and thus not required to receive and forward the message.

In step or process 414, the mesh device can optionally detect whether there is a problem mesh network within communication range. A problem mesh network can be a mesh network whose bandwidth usage is near or at its limit and cannot service requests from outside the mesh network.

If a problem mesh network is detected, the mesh device proceeds to step or process 416. If no problem mesh network is detected, the mesh device proceeds to step or process 418.

In step or process 416, the mesh device can optionally delete entries related to the problem mesh network from the neighborhood table. Because each entry in the neighborhood table includes a network identifier, all entries associated with the problem mesh network can be easily located and deleted.

In step or process 418, the mesh device can optionally test whether a neighbor information request has been received. For example, the neighbor information request can be triggered at a predetermined time by the mesh device. A randomizing component can be added to the predetermined time so that not all neighboring mesh devices attempt to broadcast neighbor information at the same time.

Alternatively, the neighbor information request can be received over the mesh network. For example, the first access point can periodically initiate neighbor information exchanges by transmitting neighbor information requests to each mesh device within its mesh network.

If a neighbor information request has been received, the mesh device proceeds to step or process 420. If no neighbor information request has been received, the mesh device proceeds to step or process 422.

In step or process 420, the mesh device can optionally broadcast neighbor information. The neighbor information can be retrieved from the neighborhood table and include information as discussed above.

In step or process 422, the mesh device can exit the procedure. It will be appreciated the procedure can be repeatedly executed by the mesh device while powered.

Figures 5A, 5B:
FIG. 5A illustrates a data structure for storing a neighborhood table, according to an exemplary embodiment.
FIG. 5B illustrates a data entry for storing neighborhood table information, according to an exemplary embodiment.

FIG. 5A illustrates an exemplary data structure 500 for storing a neighborhood table. The data structure can be stored in accessible memory on a mesh device or an access point.

The data structure 500 includes entries 502, each data entry 502 representing a mesh device and mesh device characteristics.

FIG. 5B illustrates an exemplary data entry 502 for storing neighborhood table information. The data entry 502 may include one or include a plurality of fields for storing characteristics of a neighboring device, some of which fields may be optional.

A tree PAN identifier 504 may be provided and can be a binary two byte data field for identifying a network tree associated with the mesh device. The tree PAN identifier 504 can refer to foreign networks.

A neighbor address 506 may be provided and can be a binary two byte data field for identifying an address of the mesh device.

A neighbor PAN identifier 508 may be provided and can be a binary two byte data field for identifying a membership of the mesh device.

An average quality 510 may be provided and can be an unsigned 8-bit data field for specifying an average quality of the mesh device's path to an access point.

A number of hops 512 may be provided and can be an unsigned 8-bit data field for specifying a number of hops between the mesh device and an access point.

A minimum quality 514 may be provided and can be an unsigned 8-bit data field for specifying a minimum quality of the mesh device's path to an access point.

A freshness indicator 516 may be provided and can be an unsigned 8-bit data field for specifying how recently the mesh device information was received.

Figure 6A:
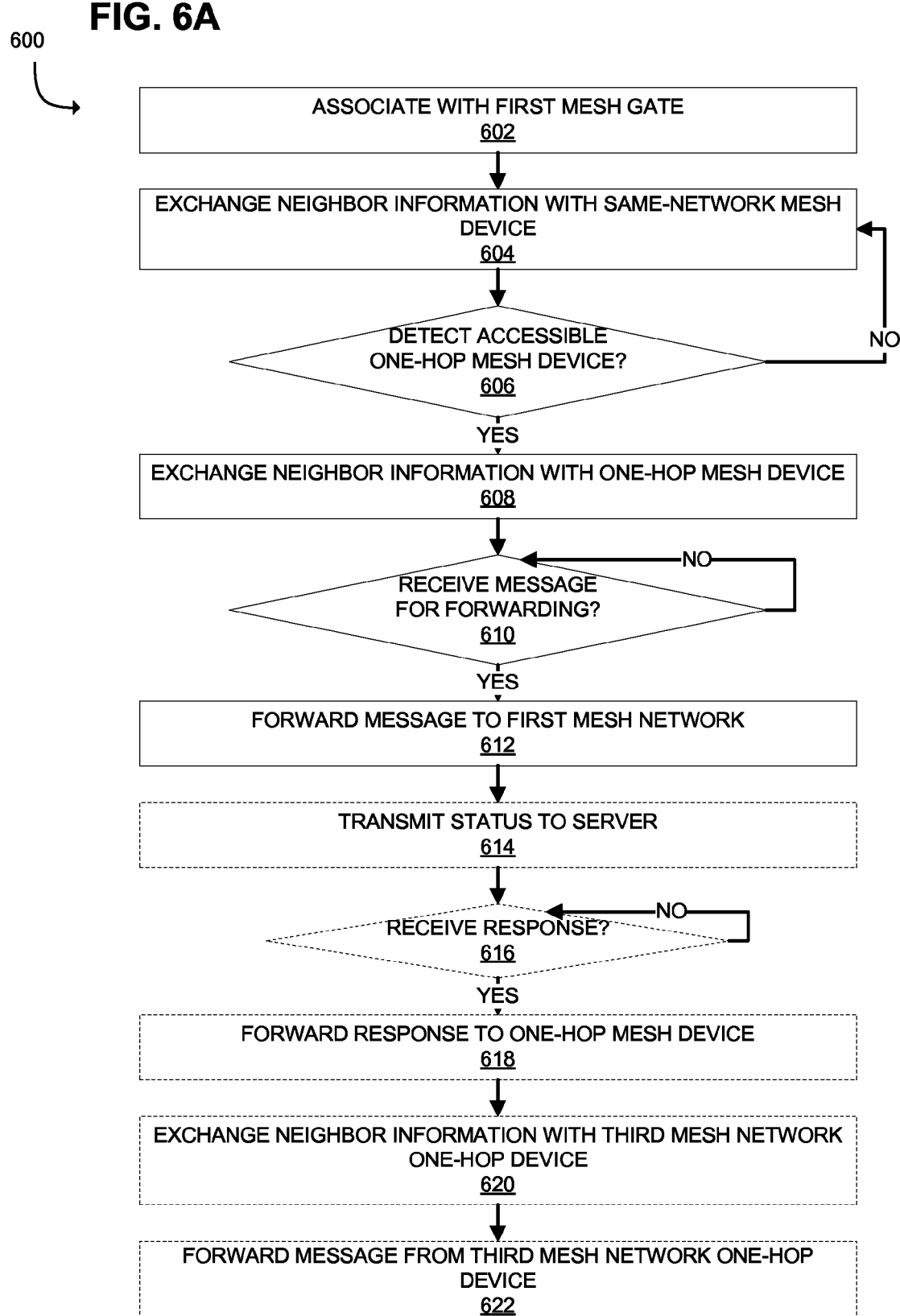
FIG. 6A illustrates a process for a zero-hop device to forward communications between a first mesh network and a second mesh network, according to an exemplary embodiment.

FIG. 6A illustrates an exemplary process 600 for a zero-hop mesh device to forward communications between a first mesh network and a second mesh network. The procedure may execute on a mesh device on the border of a first mesh network and within radio range of a mesh device of a second mesh network. The procedure may allow mesh devices of the two mesh networks to communicate and provide network overlap. The zero-hop device may be a mesh device associated with the first mesh network but storing neighbor information of at least one one-hop device associated with the second mesh network. Thus, the zero-hop device may facilitate communications between the first mesh network and the one-hop device.

In process or step 602, the mesh device may associate with a first mesh gate. For example, the mesh device may execute a search routine on power-up or when communication with an associated mesh gate is lost. The mesh device may search for nearby mesh gates and select one for association based on a variety of factors such as signal strength, number of hops to the mesh gate, and mesh gate load. The mesh device may transmit an association request to the mesh gate via the mesh network and receive an acknowledgement. After the mesh device is associated with a mesh gate, it may participate in the first mesh network as a node and communicate with a server over a WAN via the mesh gate. It may also communicate with other mesh devices in the mesh network.

In process or step 604, the mesh device may exchange neighbor information with one or more same-network mesh devices. For example, neighbor information may include a best parent field, a best five parents field, a mesh gate load field, a number of hops to the mesh gate field, and a mesh gate path signal quality field. The neighbor information may be compiled by the mesh device for every neighboring mesh device with which it is in communication, and used to determine a path for messages to be transmitted. The exchange of neighbor information may occur at a pseudo-random periodic interval, for example, once every hour at a random time. This allows all mesh devices in the mesh network to exchange neighbor information and build up a stored neighbor information table.

In process or step 606, the zero-hop mesh device may test whether a one-hop mesh device is accessible. For example, the one-hop mesh device may be associated with a second mesh network and communicate on a second mesh radio channel. The mesh device may scan alternate mesh radio channels until an accessible one-hop mesh device is found. In an alternative, the mesh networks may communicate on different frequencies. If an accessible one-hop mesh device is not found, the mesh device may assume no one-hop mesh devices are within radio range and wait a time-out period before re-testing.

If a one-hop mesh device is accessible, the procedure may proceed to process or step 608. If a one-hop mesh device is not accessible, the procedure may proceed to 604 and continue functioning as a node in the first mesh network. The zero-hop mesh device may periodically check whether a one-hop mesh device has become accessible.

In process or step 608, the zero-hop mesh device may exchange neighbor information with the one-hop mesh device. For example, the neighbor information may be compiled from neighbor information exchanges as discussed above. The neighbor information may include, in addition to the contents discussed above, a mesh network identifier for each mesh device indicating the mesh devices are associated with the first mesh network.

In process or step 610, the mesh device may receive a message for forwarding from the one-hop mesh device. For example, the one-hop device may desire to transmit a message to a neighbor of the zero-hop device on the first network. Instead of transmitting the message to the mesh gate associated with the second mesh network, forwarding the message to the mesh gate associated with the first mesh network over the WAN, and forwarding the message to the correct mesh device, the one-hop device may request the zero-hop device forward the message. This reduces network load and improves network performance.

In an alternative embodiment, the message may be addressed to a server. In this example, the one-hop mesh device may lose communications with its associated mesh gate. The one-hop mesh device may transmit the message to the zero-hop device for forwarding to the associated mesh gate via the first mesh network.

If a message is received for forwarding, the procedure may proceed to process or step 612. If no message is received for forwarding, the procedure may remain in process or step 610. The zero-hop mesh device may continue to function as a node within the first mesh network and periodically check whether a message has been received from the one-hop mesh device for forwarding on the first mesh network.

In process or step 614, the zero-hop mesh device may optionally transmit a status to a server. For example, the status may include neighbor information including the one-hop mesh devices. The neighbor information may allow the server to better route message traffic considering the mesh network overlap between the first mesh network and the second mesh network.

In process or step 616, the zero-hop mesh device may optionally test whether a response has been received from the server. For example, the message forwarded on behalf of the one-hop mesh device may require a response from the recipient, whether a mesh device within the first mesh network or the server. The response may be transmitted to the zero-hop mesh device via the first mesh gate and the first mesh network.

In an alternative embodiment, the server may transmit the message to the mesh device when the mesh gate associated with the one-hop mesh device has failed. This provides path diversity in case of mesh gate failure.

In process or step 618, the mesh device may optionally forward the received response to the one-hop mesh device. The mesh device may check that the one-hop mesh device is in its neighborhood table and forward the message to the one-hop mesh device. If the second mesh network is on a different mesh radio channel or frequency, the mesh device may utilize the correct mesh radio channel or frequency. For example, the second mesh network mesh radio channel or frequency may be stored in the neighbor information.

In process or step 620, the mesh device may optionally exchange neighbor information with a third mesh network one-hop device. Similar to the second mesh network one-hop device, the mesh device may attempt to detect and exchange neighbor information with a one-hop mesh device on a third mesh network. This creates a network overlap between the first and third mesh networks. In addition, the third mesh network one-hop device may also reach the second mesh network one-hop device via the zero-hop mesh device.

In process or step 622, the zero-hop mesh device may optionally forward a message from the third mesh network one-hop device to the first mesh network. Similar to the second mesh network one-hop device, the zero-hop mesh device may receive messages from the third mesh network one-hop device and forward the message to the first mesh network, and possibly the first mesh gate and the server.

In an alternative embodiment, any number of one-hop mesh devices from any number of mesh networks may be supported within the first mesh network, limited only by the radio range and memory capacity of the mesh device. This creates path diversity and network overlap between the mesh networks.

In operation, the mesh device may interface between the first mesh network and at least one one-hop mesh device. The one-hop mesh device may be associated with another mesh network and mesh gate. By providing an interface between the first mesh network and the one-hop mesh device, network overlap is created and path diversity is provided. This improves mesh network performance and reduces WAN load by allowing mesh network-level communications between mesh networks, instead of requiring all such communications to be forwarded through the WAN.

FIG. 6B illustrates an exemplary process 650 for a one-hop device to forward communications between a first mesh network and a second mesh network. The procedure may execute on a mesh device on the border of a second mesh network and within radio range of a mesh device of a first mesh network. The procedure may allow mesh devices of the two mesh networks to communicate and provide network overlap. A one-hop device may be a mesh device associated with the second mesh network and storing neighbor information of at least one zero-hop mesh device associated with the first mesh network. Thus, the one-hop device may facilitate communications between the second mesh network and the zero-hop mesh device.

In process or step 652, the one-hop mesh device may associate with a second mesh gate. For example, the one-hop mesh device may execute a search routine on power-up or when communication with an associated mesh gate is lost. The one-hop mesh device may search for nearby mesh gates and select one for association based on a variety of factors such as signal strength, number of hops to the mesh gate, and mesh gate load. The one-hop mesh device may transmit an association request to the mesh gate via the mesh network and receive an acknowledgement. After the one-hop mesh device is associated with the second mesh gate, it may participate in the second mesh network as a node and communicate with a server over a WAN via the second mesh gate. It may also communicate with other mesh devices in the second mesh network.

In process or step 654, the one-hop mesh device may exchange neighbor information with a two-hop mesh device. The two-hop mesh device may be a mesh device within the second mesh network that is one hop further from the second mesh network border. For example, the two-hop mesh device may be a parent of the one-hop mesh device.

Neighbor information may include a best parent field, a best five parents field, a mesh gate load field, a number of hops to the mesh gate field, and a mesh gate path signal quality field. The neighbor information may be compiled by the one-hop mesh device for every neighboring mesh device with which it is in communication, and used to determine a path for messages to be transmitted. The neighbor information may occur at a pseudo-random periodic interval, for example, once every hour at a random time. This allows all mesh devices in the mesh network to exchange neighbor information and build up a stored neighbor information table.

In process or step 656, the one-hop mesh device may test whether a zero-hop mesh device is accessible. For example, the zero-hop mesh device may be associated with a first mesh network and communicate on a first mesh radio channel. The one-hop mesh device may scan alternate mesh radio channels until an accessible zero-hop mesh device is found. In an alternative, the mesh networks may communicate on different frequencies. If an accessible zero-hop mesh device is not found, the mesh device may assume no zero-hop mesh devices are within radio range and wait a time-out period before re-testing.

If a zero-hop mesh device is accessible, the procedure may proceed to process or step 658. If a zero-hop mesh device is not accessible, the procedure may proceed to process or step 654 and continue functioning as a node in the second mesh network. The one-hop mesh device may periodically check whether a zero-hop mesh device has become accessible.

In process or step 658, the one-hop mesh device may exchange neighbor information with the zero-hop mesh device. For example, the neighbor information may be compiled from neighbor information exchanges as discussed above. The neighbor information may include, in addition to the contents discussed above, a mesh network identifier for each mesh device indicating the mesh devices are associated with the second mesh network.

In process or step 660, the one-hop mesh device may receive a message for forwarding to the zero-hop mesh device. For example, the one-hop mesh device may desire to transmit a message to a neighbor of the zero-hop device on the first network. Instead of transmitting the message to the second mesh gate associated with the second mesh network, forwarding the message to the first mesh gate associated with the first mesh network over the WAN, and forwarding the message to the correct mesh device on the first mesh network, the one-hop device may request the zero-hop device forward the message. This reduces network load and improves network performance.

In an alternative embodiment, the message may be addressed to a server. In this example, the one-hop mesh device may lose communication with its associated mesh gate. The one-hop mesh device may transmit the message to the zero-hop device for forwarding to the associated mesh gate via the first mesh network.

In an alternative embodiment, the message may be received from a two-hop mesh device for forwarding to the first mesh network. For example, the two-hop mesh device may be a parent of the one-hop mesh device on the second mesh network and desire to transmit a message to the first mesh network. The one-hop and zero-hop mesh devices may forward the message to the first mesh network.

If a message is received for forwarding, the procedure may proceed to process or step 662. If no message is received for forwarding, the procedure may remain in process or step 660. The one-hop mesh device may continue to function as a node within the second mesh network and periodically check whether a message has been received from the two-hop mesh device for forwarding to the first mesh network.

In process or step 664, the one-hop mesh device may optionally transmit a status to a server via the zero-hop mesh device. For example, the status may include neighbor information including the two-hop mesh devices. The neighbor information may allow the server to better route message traffic considering the mesh network overlap between the first mesh network and the second mesh network.

In process or step 666, the one-hop mesh device may optionally test whether a response has been received from the server. For example, the message forwarded on behalf of the two-hop mesh device may require a response from the recipient, whether a mesh device within the first mesh network or the server. The response may be transmitted to the mesh device via the zero-hop mesh device.

In an alternative embodiment, the server may transmit the message to the mesh device when the second mesh gate has failed. This provides path diversity in case of mesh gate failure.

In process or step 668, the one-hop mesh device may optionally forward the received response to the two-hop mesh device. The one-hop mesh device may check that the two-hop mesh device is in its neighborhood table and forward the message to the two-hop mesh device.

The first mesh network may be on a different mesh radio channel or frequency. The one-hop mesh device may utilize the correct mesh radio channel or frequency when communicating with the zero-hop device. For example, the first mesh network mesh radio channel or frequency may be stored in the neighbor information.

In process or step 670, the one-hop mesh device may optionally exchange neighbor information with a third mesh network zero-hop device. Similar to the first mesh network zero-hop device, the one-hop mesh device may attempt to detect and exchange neighbor information with a zero-hop mesh device on a third mesh network. This creates a network overlap between the second and third mesh networks.

In process or step 672, the one-hop mesh device may optionally forward a message to the third mesh network zero-hop device. Similar to the first mesh network zero-hop device, the one-hop mesh device may receive messages from the third mesh network zero-hop device.

In an alternative embodiment, any number of first-hop mesh devices from any number of mesh networks may be supported within the second mesh network, limited only by the radio range and memory capacity of the mesh device. This creates path diversity and network overlap between the mesh networks.

In operation, the mesh device may interface between any number of mesh networks and the second mesh network. The zero-hop mesh device may be associated with another mesh network and mesh gate. By providing an interface between the second mesh network and the zero-hop mesh devices, network overlap is created and path diversity is provided. This improves mesh network performance and reduces WAN load by allowing mesh network-level communications between mesh networks, instead of requiring all such communications to be forwarded through the WAN.

Although the above embodiments have been discussed with reference to specific example embodiments, it will be evident that the various modification, combinations and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method for a first mesh device to communicate in an overlapping mesh network environment, the method comprising:
    associating with a first access point over a first mesh network, wherein the first access point manages the first mesh network;
    responsive to receiving a neighbor information broadcast from a neighboring mesh device, updating a neighborhood table stored in an accessible memory, wherein the neighbor information includes a neighboring mesh device information and a neighboring mesh device network identifier;
    responsive to detecting a problem mesh network, deleting entries in the neighborhood table associated with the problem mesh network;
    responsive to a request to transmit a message to a destination, determining a next device, wherein the next device is on a calculated path towards the destination, the path including mesh devices from a plurality of mesh networks; and
    transmitting the message to the next device.

2. The method of claim 1, wherein the calculated path is calculated by at least one of: the first mesh device and the first access point.

3. The method of claim 1, wherein the next device is one hop closer to the destination.

4. The method of claim 1, wherein the first access point manages the first mesh network by handling association requests from mesh devices of the first mesh network and maintaining a mesh device information table of mesh devices within the first mesh network.

5. The method of claim 1, wherein the destination is at least one of: a server, an access point, and another mesh device.

6. The method of claim 1, wherein the calculated path includes mesh devices associated with any number of mesh networks.

7. The method of claim 6, wherein the first mesh device is associated with the first access point when it is included in a neighborhood table of the first access point and utilizes services provided by the first access point.

8. The method of claim 1, wherein the request to transmit is received from at least one of: the first mesh device, and a message received from the neighboring mesh device for forwarding.

9. The method of claim 8, wherein the destination is any access point reachable from the first mesh device.

10. The method of claim 8, wherein the message is received from any access point reachable from the first mesh device.

11. The method of claim 1, wherein an access point is reachable from the first mesh device when there exists a bidirectional path between the access point and the first mesh device over the mesh network.

12. The method of claim 1, wherein the calculated path is received from the first access point and stored in the accessible memory.

13. The method of claim 1, further comprising:
    responsive to a neighbor request or predetermined trigger, broadcasting neighbor information to neighboring mesh devices.

14. A system for communicating in an overlapping mesh network environment, comprising:
    a plurality of access points, each access point managing a mesh network; and
    a plurality of mesh devices, each mesh device associated with a mesh network, wherein each mesh device is configured to:
        (i) responsive to receiving a neighbor information broadcast from a neighboring mesh device, update a neighborhood table stored in an accessible memory, wherein the neighbor information includes a neighboring mesh device information and a neighboring mesh device network identifier;
        (ii) responsive to detecting a problem mesh network, delete entries in the neighborhood table associated with the problem mesh network;
        (iii) responsive to a request to transmit a message to a destination, determine a next device, wherein the next device is on a calculated path towards the destination, the path including mesh devices from a plurality of mesh networks; and
        (iv) transmit the message to the next device.

15. The system of claim 14, wherein the destination is at least one of: a server, an access point, and another mesh device.

16. The system of claim 14, wherein the calculated path includes mesh devices associated with at least two mesh networks.

17. The system of claim 14, wherein the request to transmit is received from at least one of: the mesh device, and a message received from the neighboring mesh device for forwarding.

18. The system of claim 17, wherein the destination is any access point reachable from the mesh device.

19. The system of claim 17, wherein the message is received from any access point reachable from the mesh device.

20. The system of claim 19, wherein an access point is reachable from the first mesh device when there exists a bidirectional path between the access point and the first mesh device over the mesh network.

21. The system of claim 14, wherein the calculated path is received from an access point and stored in the accessible memory.

22. The system of claim 14, where each mesh device is further configured to:
    responsive to a neighbor request or predetermined trigger, broadcast the neighbor information to neighboring mesh devices.

23. The system of claim 14, wherein different mesh networks communicate on different predetermined radio frequencies.

24. A mesh device for communicating in an overlapping mesh network environment, comprising:
    a radio for communicating on a predetermined mesh network channel;
    a memory for storing a neighborhood table;

a processor configured to:
- associate with a first access point over a first mesh network via the radio, wherein the first access point manages the first mesh network;
- responsive to receiving a neighbor information broadcasted from a neighboring mesh device, update the neighborhood table stored in the memory, wherein the neighbor information includes a neighboring mesh device information and a neighboring mesh device network identifier;
- responsive to detecting a problem mesh network, delete entries in the neighborhood table associated with the problem mesh network;
- responsive to a request to transmit a message to a destination, determine a next device, wherein the next device is on a calculated path towards the destination, the path including mesh devices from a plurality of mesh networks; and
- transmit the message to the next device via the radio.

25. A non-transitory computer-readable medium including instructions adapted to execute a method for a first mesh device to communicate in an overlapping mesh network environment, the method comprising:
- associating with a first access point over a first mesh network, wherein the first access point manages the first mesh network;
- responsive to receiving a neighbor information broadcasted from a neighboring mesh device, updating a neighborhood table stored in an accessible memory, wherein the neighbor information includes a neighboring mesh device information and a neighboring mesh device network identifier;
- responsive to detecting a problem mesh network, deleting entries in the neighborhood table associated with the problem mesh network;
- responsive to a request to transmit a message to a destination, determining a next device, wherein the next device is on a calculated path towards the destination, the path including mesh devices from a plurality of mesh networks; and
- transmitting the message to the next device.

* * * * *